United States Patent
Bolle et al.

(10) Patent No.: US 6,889,729 B2
(45) Date of Patent: May 10, 2005

(54) METHOD OF PRESSURE AND GAS VOLUME COMPENSATION IN A FUEL TANK IMPLEMENTING THE METHOD

(75) Inventors: Dirk Bolle, Bonn (DE); Volker Treudt, Windeck (DE)

(73) Assignee: Kautex Textron GmbH & Co.KG, Bonn (DE)

( * ) Notice: Subject to any disclaimer, the term of this patent is extended or adjusted under 35 U.S.C. 154(b) by 0 days.

(21) Appl. No.: 10/456,662

(22) Filed: Jun. 6, 2003

(65) Prior Publication Data

US 2003/0226596 A1 Dec. 11, 2003

(30) Foreign Application Priority Data

Jun. 6, 2002 (DE) .......................................... 102 25 327

(51) Int. Cl.⁷ ................................................ B65B 1/04
(52) U.S. Cl. ........................ 141/286; 141/302; 123/520
(58) Field of Search ................................ 141/192, 198, 141/95, 286, 301, 302; 123/518–521

(56) References Cited

U.S. PATENT DOCUMENTS

| 4,829,968 A | | 5/1989 | Onufer ......................... 123/518 |
| 5,931,141 A | * | 8/1999 | Chino .......................... 123/520 |
| 6,014,958 A | * | 1/2000 | Miwa et al. ................. 123/520 |
| 6,354,280 B1 | * | 3/2002 | Itakura et al. .............. 123/519 |
| 6,463,965 B1 | * | 10/2002 | Rasche et al. ................ 141/65 |

* cited by examiner

Primary Examiner—Steven O. Douglas
(74) Attorney, Agent, or Firm—Grossman Tucker Perreault & Pfleger, PLLC

(57) ABSTRACT

In a method of pressure and/or gas volume compensation within a fuel tank in relation to movement-induced and/or temperature-induced changes in pressure and/or volume, as when fuel is drawn from the tank and upon refuelling of the tank, any changes in pressure outside a predetermined normal pressure range are compensated by condensation of the gaseous fuel or gasification of the liquid fuel within a system which is hermetically closed off at least above atmospheric pressure. The invention also provides a tank operating on that basis.

19 Claims, 2 Drawing Sheets

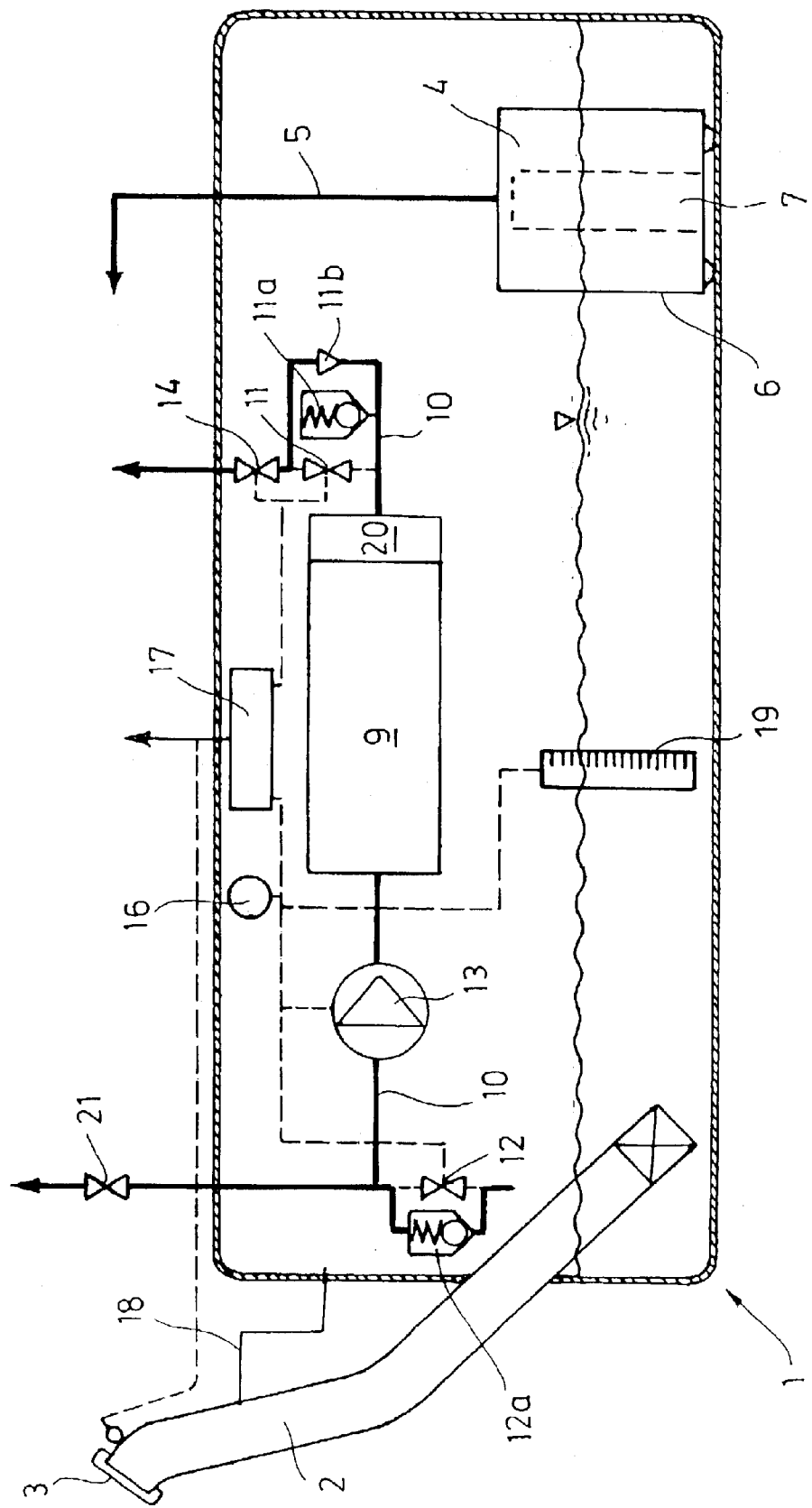

METHOD OF PRESSURE AND GAS VOLUME COMPENSATION IN A FUEL TANK IMPLEMENTING THE METHOD

FIELD OF THE INVENTION

The invention concerns a method of pressure and gas volume compensation in a fuel tank in relation to changes in pressure and/or volume induced by movement and/or temperature.

The invention further concerns a fuel tank such as for example for a motor vehicle, capable of providing for pressure and gas volume compensation in relation to changes in pressure and/or volume induced by movement and/or temperature.

BACKGROUND OF THE INVENTION

Both during a tank refuelling procedure and also while a vehicle in which a tank is used is in operation and stationary, it is necessary to ensure that fuel vapor above the level of fuel in the fuel tank is appropriately discharged so that the fuel tank can be filled with fuel or so that an unacceptably increased pressure is not generated in the tank. In the case of a tank refuelling procedure a volume of gas of up to 60 liters per minute may typically be displaced from the tank by the incoming flow of fuel. The displaced fuel usually involves a mixture of gaseous hydrocarbons and air. Likewise, during normal operation of a motor vehicle, gaseous hydrocarbons are given off, which under certain operating conditions could result in an unacceptable rise in the pressure in the fuel tank. As is known, an increase in temperature increases the tendency on the part of the fuel to change from the liquid phase to the gaseous phase. That phenomenon is further promoted by shaking and rolling movements of the fuel tank. The accumulation of gas in the fuel tank, induced by temperature and/or movement, is usually removed from the fuel tank by way of operational venting conduits, in which case the volatile hydrocarbons are then deposited in a fuel vapor filter which is typically in the form of an activated carbon filter. The fuel vapor filter should be so designed that virtually completely purified air is discharged from the filter to the ambient atmosphere.

In terms of refuelling a motor vehicle, two different forms of venting are known, more specifically in Europe the very widespread procedure involves suction removal of the displaced volume of gas at the refuelling gun, in which case only a part of the displaced volume of gas is passed to the fuel vapor filter, while in the USA the procedure involves completely removing the volume of gas produced by way of the fuel vapor filter which is fitted in the vehicle.

At any event residual emissions of hydrocarbons reach the atmosphere through the fuel vapor filter, and that is basically detrimental for reasons relating to the emission of pollutants.

In this respect reference may be made to U.S. Pat. No. 4,829,968 in which fuel vapor from the free volume in the fuel tank above the level of fuel therein is caught in a collecting container provided with an activated carbon filling and a heating element. The hydrocarbons which are adsorbed by the activated carbon are fed in the gaseous phase under pressure back to the fuel again by way of a sparger discharge unit disposed below the level of the liquid. Within the collecting container which includes a fuel vapor filter air and liquid hydrocarbons are separated in the usual manner by deposit of the hydrocarbons at the activated carbon. The air which is cleared of hydrocarbons in that way is discharged to the atmosphere.

It will be seen therefore that the problem of pollution of the atmosphere by residual emissions from the fuel vapor filter still applies in this case.

SUMMARY OF THE INVENTION

An object of the present invention is to provide a method of compensating for changes in pressure and/or volume in a fuel tank, such that hydrocarbon emissions to the atmosphere can be very substantially reduced.

Another object of the present invention is to provide a method of pressure and gas volume equalisation in a fuel tank which affords an effective way of reducing atmospheric pollution due to hydrocarbon emissions from the tank.

Still another object of the present invention is to provide a fuel tank as for a motor vehicle which allows for compensation of variations in pressure and/or volume in the tank, in such a way as to very substantially eliminate hydrocarbon emissions to the atmosphere due to venting of the tank.

In accordance with the present invention in the method aspect the foregoing and other objects are attained by a method of pressure and gas volume compensation in a fuel tank in the event of changes in pressure and/or volume induced by movement and/or temperature, wherein any change in pressure outside a predetermined normal pressure range is compensated by condensation of gaseous fuel or gasification of liquid fuel within a system which is hermetically sealed with respect to the atmosphere at least above atmospheric pressure.

As will be seen in greater detail from the description hereinafter of preferred embodiments of the invention the invention can be summed up to the effect that the fuel tank is held within a predefined normal pressure range as a system which is hermetically closed off with respect to the atmosphere and from which neither vapor nor liquid hydrocarbon emissions can pass outwardly, that is to say to the ambient atmosphere. In this respect the term normal pressure range is used to denote a pressure range which includes all normal operating conditions of a motor vehicle in which the fuel tank is fitted, more specifically when the vehicle is stationary with or without sun acting thereon, when the vehicle is moving, for example when it is moving along without drawing fuel, and operation of the vehicle with fuel being drawn, with frequent changes between acceleration and deceleration. All those operating conditions result in an increased incidence of generation of fuel vapor or increased formation of gas within the fuel tank, which results in a rise in the pressure in the tank. According to the invention a rise in pressure beyond an inadmissible maximum degree is prevented by the volatile hydrocarbons which are generated in the fuel tank being condensed. That is based on the realisation that gasification of liquid fuel involves an increase in volume by about a factor of 1000. In other words, 10 liters of fuel in gas form correspond to approximately 10 ml of fuel in liquid form. Usually a fuel tank has an expansion volume which is still sufficient at the maximum level of filling of the tank. It is rare that a fuel tank will involve more than between about 7 and 10 liters per minute of fuel in gas form which can no longer be held in the expansion volume of the fuel tank. That amount of gas which exceeds the capacity of the expansion volume to accommodate gaseous fuel and which is normally discharged from the fuel tank by way of the fuel vapor filter thereof is to be condensed in order to keep the internal pressure in the tank within admissible limit values. In the event that fuel is taken from the interior of the fuel tank to the engine of the motor vehicle the internal pressure in the tank regulates itself within certain limits by virtue of the resulting drop in pressure entailing an increased tendency on the part of the fuel to go into the gaseous phase.

In accordance with a preferred feature of the invention an increased pressure in relation to atmospheric pressure is provided as the normal pressure range, for example of the order of magnitude of between 5 and 50 millibars. An increased pressure which in principle obtains in the fuel tank is advantageous in regard to the smallest possible proportion of hydrocarbons or fuel, in gaseous form. Increasing the pressure causes a reduction in the boiling temperature of the fuel so that, with a slightly increased pressure in relation to atmospheric pressure, the fuel is less ready to be transferred from the liquid phase into the gaseous phase.

As an increased pressure in the fuel tank is not desirable in a refuelling procedure for the increased pressure obtaining in the fuel tank would abruptly escape upon opening of the tank filler cap, a preferred feature of the invention provides that pressure compensation with the atmosphere can be made immediately prior to or upon refuelling. A pressure compensation operation of that kind is then desirably effected by way of the fuel vapor filter which is present in any case, for example on the basis of a starting signal which is derived from the signal related to opening of the tank refuelling flap in the body of the motor vehicle.

There are various possible ways that can be envisaged for condensing gaseous fuel, for example by way of a temperature drop.

In accordance with a preferred feature of the invention however condensation of the gaseous fuel is effected within a fuel vapor filter into which the fuel vapor is conveyed or through which the fuel vapor is circulated. The fuel vapor filter generally contains a granular sorbent which by virtue of its adsorptive properties binds the fuel to the internal surface thereof. Binding of the gaseous fuel in a fuel vapor filter in the form of an activated carbon filter has proven to be particularly advantageous.

It will be appreciated that the effectiveness of an activated carbon filter is greatly reduced by the external surface of the activated carbon being wetted with fuel. It is therefore possible to implement a series of measures intended to ensure that liquid hydrocarbons do not pass into the activated carbon filter. However the effectiveness of the activated carbon filter is not reduced by fuel vapor condensed therein as the fuel vapor is condensed at the internal surface of the activated carbon. Activated carbon has an extremely high storage capacity and can retain condensed fuel over a comparatively wide temperature range. The storage capacity of an activated carbon filter of usual dimensions is readily sufficient to manage the amount of gas which occurs under the above-described operating conditions. A normally designed fuel vapor filter accommodates about 200 grams of hydrocarbons. The filter can then be regenerated in operation of the motor vehicle by way of a suitable purge line.

In accordance with a preferred feature of the invention the gaseous fuel is transported by means of a gas delivery pump.

Refuelling of the fuel tank can also involve the formation of not inconsiderable amounts of gas which are displaced out of the interior of the tank by the liquid fuel. Depending on the refuelling speed, as mentioned above, up to 60 liters per minute of volume can be displaced. The amount of gas produced can either be passed entirely by way of the fuel vapor filter or can be removed by a suction effect at the refuelling gun. In the latter case it is desirable if delivery or circulation of the gaseous fuel into or through the fuel vapor filter is effected at least from time to time also in a refuelling procedure, even if the closed nature of the system in relation to the ambient atmosphere naturally cannot be maintained in the refuelling procedure.

It is possible to envisage situations in which the internal pressure of the tank falls below the defined normal pressure range. In that case it would be possible on the one hand to produce pressure equalisation with the atmosphere by opening the system, or alternatively it is possible for the fuel which has condensed in the fuel vapor filter to be converted into the gaseous phase again in order to produce a rise in the pressure in the fuel tank.

Preferably, when the internal pressure of the tank is below the normal pressure range, unloading of the fuel vapor filter can be effected by virtue of a reversal in the direction of delivery of the gas delivery pump feeding into the interior of the tank.

Also in accordance with the invention in the tank aspect the foregoing and other objects of the invention are attained by a fuel tank for a motor vehicle, comprising means for pressure and gas volume compensation in relation to changes in pressure and/or volume induced by movement and/or temperature, comprising at least one fuel vapor filter, and at least one operational venting conduit connected to the fuel vapor filter. The outlet of the fuel vapor filter is closed with respect to the atmosphere at least under normal operating conditions of the motor vehicle and in relation to changes in pressure and/or volume within the tank induced by movement and/or temperature, by way of a first valve means.

In a preferred feature of the invention the fuel tank further has means for conveying the fuel vapor into the fuel vapor filter.

For example, for conveying the fuel vapor the fuel tank may have at least one gas delivery pump disposed in the operational venting conduit of the fuel tank.

In a further preferred feature the fuel vapor filter is in the form of an activated carbon filter.

The fuel vapor filter can be connected on the one hand to the operational venting conduit and on the other hand by way of a return conduit to the interior of the container, or can communicate in that way with the volume of the container.

Alternatively the fuel vapor filter can be connected on the one hand to the operational venting conduit and on the other hand to at least one closed gas storage means.

Desirably the fuel tank may include a second valve means operable to close the operational venting conduit.

In a preferred feature the first valve arrangement may include at least one excess pressure valve. That is appropriate in particular for the reason of permitting pressure equalisation of the fuel tank with the atmosphere in the event of an inadmissibly high internal pressure in the tank in a situation involving unusual operating conditions or in the event of failure of the control means of the fuel tank.

Further objects, features and advantages of the invention will be apparent from the description hereinafter of preferred embodiments of the invention.

BRIEF DESCRIPTION OF THE DRAWING

FIG. 2 is a diagrammatic view of a fuel tank in section in a second embodiment of the invention.

DESCRIPTION OF PREFERRED EMBODIMENTS

Figure 1:
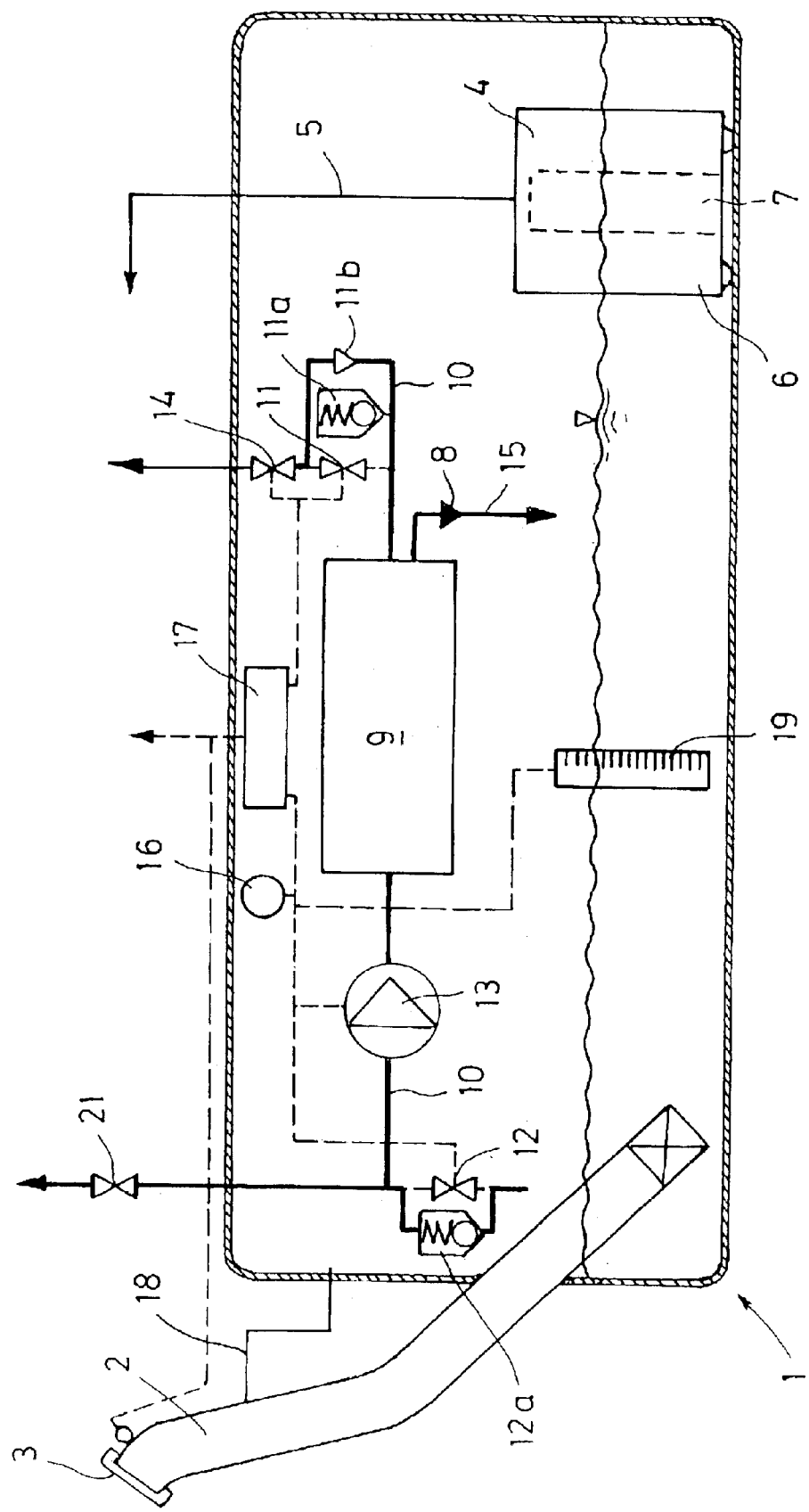
FIG. 1 is a diagrammatic view of a fuel tank in section in a first embodiment of the invention.

Referring firstly to FIG. 1, reference numeral 1 therein denotes a fuel tank as for a motor vehicle which in the usual manner includes a filler pipe 2 with a cap closure 3 and a fuel delivery 4 with which fuel can be delivered from the fuel tank 1 to the engine of a motor vehicle (not shown) by way of the fuel feed line generally identified by reference 5.

It will be noted at this point that the invention is not limited to use in relation to motor vehicle tanks but can be employed in relation to fuel tanks generally.

The fuel delivery unit 4 includes a swirl pot 6, also referred to as a surge pot, and a fuel pump 7 which is arranged therein and which supplies fuel to the fuel feed line 5.

The fuel feed system and other functional components of the fuel tank 1 are not shown here or are shown only in highly diagrammatic form for the sake of simplicity of the drawing and because the general structure and arrangement thereof are well known in the art and therefore do not need to be described in detail at this juncture.

Provided within the fuel tank 1 is a fuel vapor filter in the form of an activated carbon filter 9 which communicates with the internal volume of the fuel tank by way of an operational venting conduit 10. Above the level of fuel in the fuel tank 1, which is shown by way of indication in the lower part thereof, is a fuel gas-air mixture which, either upon refuelling of the fuel tank 1 or in the event of an unacceptable rise in the pressure within the fuel tank 1, has to be discharged from the fuel tank 1. Hereinafter the free volume above the level of fuel, constituting a head space in the fuel tank 1, is referred to for the sake of simplicity as the expansion volume.

In the case of known fuel tanks the endeavour hitherto was to provide for pressure equalisation between the interior of the fuel tank and the ambient atmosphere. The interior of the fuel tank was in continuous communication with the atmosphere by way of an activated carbon filter. It is here that the invention seeks to afford a remedy in regard to such communication for the purposes of minimising the level of emissions resulting therefrom.

In the embodiment described herein the fuel tank 1 is hermetically closed off in operation of the motor vehicle or when it is stopped, that is to say for example when it is not being refuelled. Disposed within the fuel tank 1 in the expansion volume thereof is the above-mentioned operational vent conduit 10 which is passed out of the fuel tank 1 from the expansion volume thereof by way of the activated carbon filter which is indicated at 9 and which comprises a filter container with sorbent therein.

A first switchable valve 11 which is closed when in an unpowered condition closes the venting conduit 10 downstream of the activated carbon filter and thus closes off the entire fuel tank 1 in relation to the ambient atmosphere. A second switchable valve 12 which is also closed in an unpowered condition closes the operational venting conduit 10 upstream of the activated carbon filter 9. It will be seen that the operational venting conduit 10 opens in this region into the expansion volume of the fuel tank 1.

It will be noted at this point that the activated carbon filter 9 as well as the operatively associated valves, lines and other devices do not necessarily have to be arranged within the fuel tank 1, but such a design arrangement is generally preferred.

Reference 13 denotes a gas delivery pump arranged in the operational venting conduit 10 between the first valve 12 and the activated carbon filter 9.

In accordance with the invention when the motor vehicle in which the fuel tank 1 is fitted is stopped or when fuel is being drawn from the fuel tank by the engine of the motor vehicle the first and second valves 11 and 12 are closed. When the cap 3 on the filler pipe 2 is also closed the fuel tank 1 is hermetically closed off with respect to the ambient atmosphere or the environment.

At least the second valve 12 is actuatable only above a predefined normal pressure range, for example above 50 millibars internal pressure in the tank, being actuated more specifically by virtue of a control signal which is generated in dependence on pressure by a control device 17 within the tank. There is no active control of the tank pressure below a tank internal pressure of 50 millibars, to about ambient pressure. The further generation of hydrocarbon-gas mixture is throttled by virtue of a slightly increased pressure in the fuel tank 1.

If the proportion of gas in the fuel tank 1 increases by virtue of a rise in temperature or by virtue of the dynamics of movement of the motor vehicle in which the fuel tank 1 is fitted, that results in the pressure within the fuel tank rising beyond the normal pressure range. In that case the second valve 12 opens and the fuel delivery pump circulates the fuel gas in the expansion volume of the fuel tank 1 through the operational venting conduit 10 and through the activated carbon filter 9 and the return conduit 15 connected downstream thereof. That results in condensation of the fuel gas in the activated carbon filter 9 and an immediate interruption in the rise in pressure within the fuel tank 1. The residual gases issuing from the activated carbon filter 9 are passed back into the fuel tank 1 by way of the return conduit 15. If under very extreme loadings the internal pressure in the fuel tank 1 should not be reduced below an acceptable limit value, a situation which is detected by a pressure sensor 16, a signal is generated by the control device 17 for opening the valve 11. Opening of the valve 11 results in immediate pressure equalisation with the ambient atmosphere, inter alia also because a diagnosis valve 14 connected downstream of the first valve 11 is open in the unpowered condition. The purpose of the diagnosis valve 14 is to temporarily hermetically shut off the entire fuel tank 1 for the purposes of checking sealing integrity. If the pressure falls below a pressure limit established in the control device 17 of for example 65 millibars by virtue of opening of the venting conduit 10 to the atmosphere by way of the first valve 11 then the first valve 11 is closed again. Below 50 mbar the gas delivery pump 13 is also switched off in order to keep the internal pressure in the fuel tank constantly above atmospheric pressure.

Electrical control is not possible in the event of the motor vehicle having no power. In that case the pressure in the fuel tank 1 is kept below the previously established upper limit of the normal pressure range, outgassing being minimised by that increased pressure. References 11a and 12a in FIG. 1 denote excess pressure valves which, even when there is no power in the system, above the established upper limit of the normal pressure range, allow pressure equalisation with the ambient atmosphere, more specifically by way of the diagnosis valve 14 which is open in the unpowered condition.

Reference numeral 11b denotes a check valve which, when the first valve 11 is in the closed condition, in the event of an inadmissible reduced pressure in the fuel tank 1, permits a feed flow of ambient air.

When the fuel tank 1 is being refuelled a signal is passed to the control device 17 immediately prior to opening of the fuel tank 1. When the diagnosis valve 14 is open, the signal sent to the control device 17 causes opening of the valves 11 and 12 so that any increased pressure present in the fuel tank 1 can be immediately equalised to the atmosphere. The signal line for carrying the opening signal from the cap 3 on the filler pipe 2 is only shown by way of indication as a broken line in FIG. 1.

The gas delivery pump 13 can be temporarily switched on to reduce the internal pressure in the fuel tank at the beginning of a refuelling procedure.

In a refuelling procedure the hydrocarbon-laden gases can be conducted past the activated carbon filter 9 directly to the filler pipe 2 in order for them then to be removed by suction at the filler gun, as in the case of the European system referred to hereinbefore. In that case unnecessary loading of the activated carbon filter 9 is avoided in a refuelling procedure.

In order to avoid excessive ingress of ambient air into the fuel tank 1 in a tank refuelling operation a recirculation conduit indicated at 18 is connected between the filler pipe 2 and the interior of the tank.

When a small amount of gas is produced during a refuelling procedure the diagnosis valve 14 or the valve 11 can be temporarily closed and the gas delivery pump 13 switched on. The residual gases from the activated carbon filter 9 are then urged back into the tank by way of the return line 15.

Also disposed in the interior of the tank 1 is a level sender as indicated at 19. If the level sender 19 signals that the tank is in the condition of being full the control device 17 causes closure of the valves 11 and/or 12 whereby the end of the refuelling procedure is initiated, that is to say a rapid rise in pressure in the interior of the tank 1 causes the automatic shut-off valve of the refuelling gun to be shut off.

Reference numeral 21 in FIG. 1 denotes a purge valve, by way of which a communication can be made from the operational venting conduit 10 to the engine of the motor vehicle. When the purge valve 21 is opened hydrocarbon-charged gas is passed by way of the activated carbon filter 9 to the combustion air of the engine for the purposes of regeneration of the activated carbon filter 9.

Reference will now be made to FIG. 2 showing an alternative configuration of the fuel tank 1 according to the invention. It will be seen that the structure of the fuel tank shown in FIG. 2 is generally the same as that of the fuel tank shown in FIG. 1, so that for the sake of simplicity and brevity only the differences between the two structures will be described in greater detail here. For that reason identical components which appear in both FIGS. 1 and 2 are denoted by the same references.

Looking therefore now more specifically at FIG. 2, in this embodiment the activated carbon filter 9 is not provided with a return line communicating with the interior of the tank 1, such line being indicated at 15 in FIG. 1, but rather a gas storage means as indicated at 20 in FIG. 2 is connected on the downstream side of the activated carbon filter 9.

In operation of the motor vehicle or when it is stopped above the normal pressure range the gas delivery pump 13, with the second valve 12 in the open condition and the first valve 11 in the closed condition, passes hydrocarbon-charged gas through the activated carbon filter 9 into the downstream-connected gas storage means 20. The gas storage means 20 is closed off in the delivery direction. As soon as the pressure in the gas storage means 20 has risen to such a degree that the gas delivery pump 13 can no longer increase it any further, the purified air is passed back into the interior of the fuel tank 1 again through the activated carbon of the activated carbon filter 9, more specifically independently by virtue of the pressure drop which occurs after the gas delivery pump 13 is switched off. That periodic unloading of the gas storage means 20 results generally in enrichment of the activated carbon filter 9 as the purified air which is discharged by way of the gas storage means 20, as it passes back through the activated carbon filter 9, takes up less hydrocarbons than it previously discharged.

At any event in both of the above-described embodiments of the invention unloading of the activated carbon filter 9 is possible by a reversal in the delivery direction of the gas delivery pump, more specifically because of the degree of saturation which then rises in the activated carbon filter in opposite relationship to the delivery direction. That results then in a rise in pressure in the interior of the tank 1. In the embodiment described with reference to FIG. 1, upon the reversal in the direction of delivery of the gas delivery pump 13, the check valve identified by reference 8 becomes operative in the return line 15 in this embodiment. In both cases the reversal in the delivery direction of the gas delivery pump 13 results in the production of a reduced pressure in the activated carbon filter 9 and that reduced pressure in turn results in increased discharge of the hydrocarbons bound therein. In addition unloading of the activated carbon filter 9 can be implemented by heating it, for example by means of a heating element suitably arranged in the activated carbon filter 9.

It will be noted that a rise in pressure in the fuel tank 1 can also be implemented in the usual manner by a feed of fresh air, in particular when the pressure falls below a critical reduced pressure. As already mentioned above however a feed of fresh air into the fuel tank 1 should be avoided as far as possible.

It will be appreciated that the above-described embodiments of the invention have been set forth solely by way of example and illustration of the principles thereof and that various modifications and alterations may be made therein without thereby departing from the spirit and scope of the invention.

What is claimed is:

1. A method of pressure and gas volume compensation in a fuel tank in the event of induced changes in at least one of the pressure and volume, comprising:

selectively compensating any change in pressure outside a predetermined normal pressure range by condensation of gaseous fuel and gasification of the liquid fuel within a system which is hermetically sealed with respect to the atmosphere at least above atmospheric pressure;

closing the fuel tank with respect to the atmosphere when the vehicle is stopped and during normal operation of the vehicle; and opening the fuel tank to the atmosphere at limited times only for purposes of pressure equalisation and refueling.

2. A method as set forth in claim 1 wherein the normal pressure range includes increased pressure in relation to atmospheric pressure.

3. A method as set forth in claim 1 wherein opening the fuel tank for purposes of refueling occurs immediately prior to refueling.

4. A method as set forth in claim 1 wherein opening the fuel tank for purposes of refueling occurs upon refueling.

5. A method as set forth in claim 1 wherein condensation of the gaseous fuel is effected within a fuel vapor filter into which fuel vapor is conveyed.

6. A method as set forth in claim 5 wherein the gaseous fuel is conveyed by means of a gas delivery pump.

7. A method as set forth in claim 5 wherein the gaseous fuel is conveyed into the fuel vapor filter at least at times in a refueling procedure.

8. A method as set forth in claim 5 further comprising unloading the fuel vapor filter with a tank internal pressure below the normal pressure.

9. A method as set forth in claim 6 further comprising unloading the fuel vapor filter by virtue of a reversal in the direction of delivery of the gas delivery pump into the interior of the tank.

10. A fuel tank comprising means for pressure and gas volume compensation in relation to induced changes in at least one of pressure and volume, comprising
at least one fuel vapor filter having an outlet,
at least one operational venting conduit connected to the outlet of the fuel vapor filter, and
first valve means for closing the outlet of the fuel vapor filter with respect to the atmosphere at least under normal operating conditions of the fuel tank and in relation to said changes within the tank,
at least one closed gas storage means, and
means connecting the fuel vapor filter to the operational venting conduit and to the gas storage means.

11. A fuel tank as set forth in claim 10 including means for conveying fuel vapor into the fuel vapor filter.

12. A fuel tank as set forth in claim 10 including at least on gas delivery pump for conveying the fuel vapor.

13. A fuel tank as set forth in claim 10 wherein the fuel vapor filter is in the form of an activated carbon filter.

14. A fuel tank as set forth in claim 10 including a return conduit connecting the fuel vapor filter to the interior of the tank.

15. A fuel tank as set forth in claim 10 including a second valve means operable to close the operational venting conduit.

16. A fuel tank as set forth in claim 10 wherein the first valve means includes at least one first switchable valve.

17. A fuel tank as set forth in claim 15 wherein the second valve means includes an second switchable valve.

18. The method of claim 1 wherein the fuel tank is opened to the atmosphere for purposes of pressure equalization in the event of inadmissibly high internal pressure in the fuel tank.

19. The method of claim 1 wherein the fuel tank is opened to the atmosphere for purposes of pressure equalization in the event of a failure of a control means of the fuel tank.

* * * * *